Patented Jan. 1, 1935

1,985,994

UNITED STATES PATENT OFFICE

1,985,994

POROUS MATERIAL AND PROCESS OF MAKING THE SAME

Harry E. Holcomb, Stratford, Conn., assignor to Johns-Manville Corporation, New York, N. Y., a corporation of New York No Drawing. Application January 13, 1932, Serial No. 586,455

18 Claims. (Cl. 18—47.5)

This invention relates to a porous material and process of making the same, and particularly to a composition comprising particles secured together by means of a porous adhesive. A preferred embodiment is the product resulting from wetting fibers of mineral wool or asbestos with an emulsion comprising a water-insoluble liquid such as gasoline and an aqueous adhesive, suitably an alkaline aqueous solution of casein, shaping the resulting mixture, and drying it.

An object of the invention is to provide a shaped, rigid, fibrous product containing intercommunicating voids that is durable, resistant to moisture, resistant to fire, and/or that may contain a coloring substance to establish a desired color. Another object is to provide an improved acoustical material that is effective in absorbing sound of audible frequencies. Another object is to provide for the manufacture of blocks of such acoustical material from a composition and by a process in which there is used an adhesive that shows a minimized migration to the outer surface, during the drying, and a satisfactory distribution of such adhesive throughout the entire block of acoustical material, after the drying is completed. Additional objects and advantages will appear from the detailed description that follows.

Acoustical blocks or shaped compositions adapted to adsorb incident sound have been made previously from fibrous material such as nodulated rock wool, a form of mineral wool made, for example, by melting and blowing an argillaceous limestone, collecting the resulting fibers in the form of a loose felt on the bottom of a settling chamber, passing the felt through a blower, to disintegrate the felt into small aggregates, and then tumbling the blown material in a drum with gauze sides to separate slag particles. The resultant product consists of small pellets or nodules known in the trade as "nodulated" or "granulated" mineral wool. In forming nodulated wool fibers into a block, there has been used a binder. The binder or adhesive sometimes used in making an acoustical block from rock wool fibers is an aqueous gel, such as a boiled or heated mixture of starch in water.

In the use of a starch gel as binder in the manufacture of acoustical articles from rock wool, there are certain disadvantages. For example, the starch migrates to the surface during the drying of a composition comprising the fibers and the starch gel. Presumably, the starch is deposited largely on the surface from which the water in the gel evaporates. In any case, the drying of a block containing the gel binder gives a rather hard and thick surface incrustation of starch which must be removed from the surface, as by cutting or sawing, to expose a surface of satisfactory texture and permeability for the absorption of sound. Furthermore, the formation of this surface incrustation by the migration of the binder to the outer surface of the block decreases the rate at which water may be evaporated from the block during the later stages of the drying process and thereby increases the length of time required for the drying. In addition, the interior of the block is left in a condition that is more or less soft in proportion to the amount of starch which is lost from the interior to the outer surface by migration.

I have now discovered that various materials, such as nodulated rock wool or asbestos, may be mixed with an improved type of adhesive composition, shaped into a block, and dried, with a minimized migration of the adhesive to the surface and the formation of a block that is hard throughout. The improved adhesive is an emulsion of a readily volatile water-insoluble liquid with an aqueous solution of an adhesive, suitably a protein.

The composition used as the adhesive in the present invention may be made as described in the application Serial Number 586,454 for U. S. patent, filed on even date herewith by Harry E. Holcomb and entitled "Adhesive composition and process of making the same". An example of an adhesive composition that may be used is made as described below. All proportions given in this example or elsewhere in the specifications or claims are parts by weight, unless otherwise specified.

Twenty-five parts of commercially dry casein, suitably grade B—1, in meal form, are swollen by soaking for approximately one-half hour in 32 parts of water. The swollen casein is then dissolved, or formed into a fairly fluid mixture, with a solution of approximately 2 parts sodium hydroxide in 7 parts of water. This dissolving gives what may be called an alkali-casein, requires some time for its completion, usually 15 to 20 minutes, and is facilitated by agitating the swollen casein with the sodium hydroxide solution until practically all grains of casein disappear. The solution (probably colloidal) of casein and sodium hydroxide in water is then mixed with or emulsified with approximately 115 parts of a mixture of substantially equal volumes of water and low-boiling gasoline. This mixing is accomplished by means of thorough agitation, as, for example, that produced by a high speed propeller. The mixing is more readily made at an elevated temperature. For this reason the mixture of water and gasoline, which is added to the casein solution, is suitably at a temperature of about 60° C. at the time of being added. When the warmed mixture of water and gasoline is stirred into the alkaline, aqueous solution of casein, a very pronounced change occurs. There is produced what appears to be an almost uniform emulsion that is viscous, in fact, more viscous than was the solution of casein in the aqueous alkali before the additional water and gasoline were added. This is very significant inasmuch as the increased viscosity is accompanied by an increase in volume, whereas such a large dilution by water alone would produce a pronounced lowering of the viscosity. Although the improved composition, diluted with the water and gasoline mixture, is sufficiently viscous to adapt it for use as a viscous adhesive, a typical composition of this kind contains only 15 to 25 ounces of casein for approximately a gallon of the finished adhesive.

Variations may be made from the details given for making the adhesive. Thus, the proportions may be varied, within limits. For example, the casein adhesive may contain 20 to 35 parts of casein, 1 to 2 or more parts of sodium hydroxide, approximately 60 to 150 parts of water, and about 30 to 110 parts of gasoline. In general, increased ratios of gasoline to water in the final mixture give increased viscosities.

Also, other materials may be used. Thus, there may be used, in place of the solution of casein in water containing sodium hydroxide, another aqueous or alkaline aqueous adhesive mixture, as, for example, a protein such as glue dissolved in water or in an alkaline aqueous mixture. In place of sodium hydroxide there may be used another alkaline compound of a metal, such as potassium hydroxide, sodium carbonate, trisodium phosphate, borax, or another inorganic material adapted to facilitate the solution of the protein in water. However, best results for many purposes are obtained when the metal compound used is a caustic alkali, preferably sodium hydroxide. Lime may be used, suitably as a substitute for a part only of the sodium hydroxide as used in the example above. The immiscible liquid preferred for mixing with the aqueous solution of the protein is low-boiling gasoline or so-called aviation gasoline. A gasoline, that has been used satisfactorily, has a density of approximately 63° Bé. and a boiling range of 104° F. to 303° F. Various other water-insoluble organic liquids may be used as a substitute for the low-boiling gasoline, as, for example, another liquid hydrocarbon, such as motor gasoline, benzol, or toluol. Ethylene dichloride may be used. Except in special cases, the immiscible liquid should be unsaponifiable, in order to avoid the presence of fats in the original adhesive composition and the possible formation of soaps by action with the alkali present. The immiscible liquid is preferably volatile. This liquid is used in substantial proportion, say, 20% or more, suitably about 40% of the weight of the other ingredients that are emulsified with the immiscible liquid.

The improved adhesive composition made as described may be used in the manufacture of a block or shaped mass comprising mineral wool fibers forming intercommunicating voids and bonded with the adhesive. The adhesive composition comprising sodium hydroxide, casein, water, and gasoline, and made as described above, may be used, for example. An amount of this adhesive composition corresponding to approximately 25 parts of casein, is mixed with 65 parts of nodulated rock wool fibers. The mixture of casein adhesive and nodulated wool is then molded, as by being shaped in a frame, at substantially no pressure or just sufficient pressure to smooth the surface by rolling. The shaped mass is then preferably allowed to stand at approximately atmospheric temperature for about a day, after which it is dried, as, for example, at 200° F., to separate readily volatile constituents thereof. The product, after thorough drying, may be cut to the exact size desired, as by sawing. The block is practically free from the odor of gasoline, is hard and rigid throughout, and contains the alkali-casein film or adhesive in porous form distributed over the surface of the fibers in such manner as to cement them together at intervals without closing the voids. The adhesive film will comprise the non-volatile ingredients of the adhesive composition added originally in the form of an emulsion.

A typical block, one inch thick, thus made from nodulated rock wool and casein adhesive, absorbs 50 to 75 percent of incident sound of various frequencies from 500 to 1,000 cycles per second. For example, such a block was found to absorb 58 to 68 percent of incident sound of 512 cycles frequency, and 63 to 74 percent of 500 to 1,000 cycles frequency, as determined by the reverberation method.

Such blocks are light in weight. They may have densities of about 18 to 21 pounds, usually about 19 pounds, per cubic foot. Such low densities indicate a large proportion of pores or voids. These voids are intercommunicating to a high degree, which explains the permeability of the block to incident sound.

An interesting feature of the block, as made and dried, is the small amount of adhesive substance that migrates to the outer surface of the block during the drying. In fact, the amount of adhesive which migrates to the surface is not sufficient to form a hard, impermeable crust thereon. The result is that the block is adapted to absorb sound, even as first made, that is, before removing the outer surface. It is desirable, however, to remove the outer surface, as by sawing, when a more nearly plain surface is desired than the somewhat wavy surface which results from simply molding the block and smoothing the surface by a roller, before the block is dried. The removal of the outer surface has no great effect on the apparent hardness of the face of the block.

It is not essential to the invention to explain the minimized migration of the binder during the drying of a fibrous block wetted therewith. The explanation may be attributed to the extended condition of the adhesive or the possible discontinuity of the aqueous phase of the adhesive emulsion over the fibers at some stage of the drying process, to the evaporation of the gasoline at a greater rate than that at which the water evaporates, with a consequent substantial decrease in the volume of the adhesive in the block, before the water begins to evaporate in large amount, and/or to the existence of inner surfaces in the fibrous composition, from which water may evaporate without migration to an outer surface. The emulsified gasoline acts as an antimigration agent, to minimize migration of the adhesive in the aqueous composition during removal of water therefrom by volatilization.

Although it is to be understood that my invention is not limited to any particular theory of action, it is probable that the mixture of the aqueous casein adhesive and the volatile water-insoluble liquid constitute an emulsion wherein the water-insoluble liquid constitutes the dispersed phase and the aqueous adhesive employed such as casein constitutes the continuous phase. This is borne out by the fact that an increase of the water content causes a marked decrease in the viscosity of the mixture. The distending effect upon the adhesive of the water-insoluble organic liquid renders it possible to spread the adhesive thru the fibers more effectively than would be possible without this effect and to bind the fibers by adhesive material deposited in situ throughout the fibers, by evaporation of the volatile constituents of the emulsion.

The film of adhesive remaining in a block made and dried as described, is not waterproof and is combustible. When it is desired to make a block water-resistant or weatherproof, a waterproofing agent may be added to the original adhesive composition, before the latter is incorporated into the rock wool. Thus, aluminum stearate may be mixed with the gasoline which is added during the preparation of the adhesive composition. The proportion of stearate may be varied, within limits. A proportion which gives satisfactory weatherproofing for most purposes, without adding excessively to the cost of the adhesive, is 2 to 3 parts of aluminum stearate to every 25 parts of casein to which the gasoline solution of the stearate is to be added. When the stearate is mixed with the gasoline, there is produced a white, milky mixture which becomes almost or quite clear when the gasoline is mixed with approximately an equal volume of hot water that raises the temperature of the resulting water, gasoline and aluminum stearate mixture to about 60° C. As an alternative material for the aluminum stearate, as waterproofing agent, there may be used some other material adapted to produce negative capillarity for water, as, for example, zinc stearate. In some cases, a water-repellant, non-volatile wax may be used, although particularly satisfactory results have been found from the use of aluminum stearate or an equivalent stearate.

In preparing an adhesive composition which, on drying, will give a fire-resistant film, there is added one or more fireproofing materials. The fireproofing material may consist of a salt of a multivalent metal, suitably one that is highly hydrated when in crystal form. Examples are hydrated magnesium ammonium phosphate and hydrated salts of aluminum, such as potash or soda alum, or aluminum sulfate (so-called "Paper maker's alum").

The method of making the adhesive film fire-resistant may be illustrated by the case in which the material added for that purpose is potash alum. A solution of casein in aqueous sodium hydroxide is made as described above. To this solution there is then added potash alum dissolved in a minimum quantity of water. The proportion of alum used may be 2 or more parts for each 25 of casein present in the solution to which the alum is to be added. After the alum has been incorporated, the gasoline and additional water are then added and mixed in, as already described. The effect of such a fire-proofing material containing a salt of a multivalent metal may include the formation of a metal compound with the casein or a hydroxide precipitated by the alkali present. Whatever changes occur between the alum, for example, sodium hydroxide, and/or casein in the solution are made use of in the process. The emulsion containing the casein adhesive and alum, or the products of their reaction, is then mixed with rock wool fibers and made into a block, as described above.

The resulting block of rock wool fibers adhesively secured together by means of the casein composition resulting from the addition of alum to the other ingredients of the composition, as described, is fire-resistant, although not entirely fireproof. Combustion initiated in the block, by means of a gas burner, becomes extinguished a few minutes after the gas flame is removed.

In some cases it may be desired to make a colored block. This may be accomplished by adding suitable pigments or dyes to the adhesive before the latter is incorporated into the rock wool fibers. The pigments or dyes used should be adapted for coloring casein or other adhesive substance used, in the presence of the alkali or other materials present. As pigments, there may be used one or more of a great variety, as, for example, an iron oxide, chrome yellow, or chrome green. As dyes, there may be used direct dyes or some acid dyes. There have been used satisfactorily those offered under the following trade names: du Pont Crocein Scarlet concentrated, Pontamine Brown C R, Pontamine Light Gray 2 G, and Pontacyl Green B, all of which are obtainable from E. I. du Pont de Nemours & Company. In incorporating the coloring substance, such as a pigment or a dye, the coloring substance is suitably admixed with the solution of casein in the aqueous alkali before the gasoline or other immiscible liquid is added. Or, the dye solution is applied to the surface of the finished block, as by spraying.

Compositions made with a coloring substance added, as described, have what appears on visual examination to be a uniform color throughout the entire composition. Thus, when the coloring substance is one of the dyes listed, the block appears to have about the same intensity of coloring throughout. Pleasing effects in colored articles or compositions may be made by choosing the particular shade of color desired.

Or, a mottled article may be made. One method of producing a mottled effect is the following. Two or more lots of alkaline aqueous casein composition are made. Each is colored by a suitable pigment or dye, to give the color desired, which should be different in each of the lots. Separate batches of nodulated rock wool are then wetted with the differently colored lots of casein composition, and the thus wetted batches of rock wool are then roughly blended together to form a non-intimate mixture, as by hand or mechanical mixing. This mixes the rock wool-casein batches of different colors into each other. The resulting mixture is then molded to shape and dried and finished as described above. For example, there may be made a composition of rock wool and blue casein adhesive, and a corresponding lot with casein adhesive of green color. These lots of different colors may then be mixed together, shaped and dried.

The size of the patches of a given color in the final mottled mixture will vary somewhat with the thoroughness of the mixing. To make an article in which the individual patches or spots of one color are relatively small, an intimate mixing should be given. To make a mottled effect in which the individual areas of a given color are relatively large, a less intimate mixing of the rock wool lots of different colors should be made.

While the invention has been illustrated by the blocks comprising nodulated rock wool and adhesive film and the process of making such blocks, it should be understood that other fibers may be substituted for the nodulated rock wool. Thus, there may be used slag wool or rock wool that has not been nodulated. Also, there may be used other inorganic fibers, as, for example, asbestos fibers. There has been used satisfactorily, as the fibrous material, blue Rhodesian asbestos, which has relatively short fibers. On the other hand, there has been used an Amosite asbestos, which has relatively long fibers. Also, a granular material, such as pumice of about 20-mesh or finer, may be substituted for all or part of the fibrous material. However, fibers are preferred at this time to granules, partly because of the lesser brittleness of the blocks made from the fiber as compared to those made from granules. Porous inorganic material may be used.

Compositions comprising asbestos, slag wool, or other inorganic fibers, may be made exactly as described above for the preparation of corresponding compositions comprising nodulated rock wool fibers. However, it has been found that a smaller proportion of adhesive substance may be used when the fibers being bonded together are asbestos fibers, than when the fibers are nodulated rock wool. Thus, there may be used 15 to 20 parts of actual casein, in the form of an emulsion of its solution in water and caustic soda with gasoline, to approximately 65 parts of fibers, when the fibers are asbestos.

Substitution of the modulated rock wool fibers by other inorganic fibers, such as those mentioned above, does not destroy the utility of the resulting shaped and dried compositions for acoustical purposes. However, the substitution does alter somewhat the density of the resulting compositions. Thus, a block made from asbestos fibers and the casein adhesive weighs from 14 to 18 pounds per cubic foot, whereas a block made similarly from slag wool and the same adhesive weighs approximately 17 to 19 pounds per cubic foot.

Compositions of fibers and adhesive adapted to be shaped into blocks, as described, may be used also to give an acoustical plaster. Thus, an adhesive composition containing a casein adhesive of the class described may be mixed with rock wool, asbestos, or organic fibers, the proportions used being such as to give a trowelable mixture, suitably a larger proportion of the adhesive composition to fibers than used in a mixture to be shaped by molding. The trowelable mixture is then plastered on a lathing. Metal lathing should be used, if a fire-resistant structure is desired. The plastered layer hardens on drying and produces a firm, sound absorbing finish.

The acoustical plaster may be made with the various features described in the case of the molded block, including fireproofing, weatherproofing, and/or a coloring substance.

The term "porous", as applied to the adhesive, is used herein to indicate that the adhesive film contains numerous, closely spaced, small, irregularly extending passageways or pores, corresponding to fluid escape channels. Such pores are to be distinguished from the relatively large open spaces between granules adhered together by a conventional type of adhesive applied, for example, in solution, in the absence of a readily volatile liquid emulsified with the solution. The pores in my improved product provide communication between voids in the particles or aggregates adhered by the adhesive and an outer surface of the article.

Since many variations from the illustrative details that have been given may be made without departing from the scope of the invention, it is intended that the invention should be limited only by the terms of the claims.

What I claim is:

1. A light weight, permeable article comprising fibers forming intercommunicating voids between them and disposed in the form of nodules and a porous adhesive distributed over the nodules, cementing them together, and providing communication between the said voids and an outer surface of the article.

2. A light weight, permeable article comprising fibers forming intercommunicating voids between them and disposed in the form of nodules, a porous protein adhesive distributed over the nodules, cementing them together, and providing communication between the said voids and an outer surface of the article.

3. A light weight, permeable article adapted for use in sound absorption, said material comprising particles of sound absorbing material provided with voids and a porous protein adhesive distributed over the particles, cementing them together, and providing communication between the said voids and an outer surface of the article.

4. An acoustical article consisting of a shaped mass comprising fibers of rock wool in the form of nodules containing intercommunicating voids and a porous alkali-casein adhesive cementing the nodules together and providing communication between the said voids and an outer surface of the article.

5. An acoustical article consisting of a shaped mass comprising fibers of asbestos defining intercommunicating voids therebetween and a porous casein adhesive cementing the fibers to one another and providing communication between the said voids and an outer surface of the article.

6. An acoustical plaster comprising void-containing particles and an emulsion of an aqueous adhesive material including a readily volatile, water-insoluble liquid constituting one phase of the emulsion, the plaster being adapted to being trowelled, to harden on drying, and to produce a firm, porous, sound-absorbing finish.

7. A method of manufacturing porous blocks which comprises mixing particles of material with a bonding material including an emulsion of an aqueous adhesive material including a readily volatile, water-insoluble liquid as a phase of the emulsion, forming the mixture into suitable shapes and treating the shaped mass to separate the said volatile liquid.

8. An acoustical block comprising nodulated rock wool and a casein adhesive, said block weighing approximately 17 to 21 pounds per cubic foot and absorbing approximately 50 to 75 percent of incident sound of a frequency of 500 to 1,000 cycles.

9. A process of manufacturing porous fibrous block material which comprises mixing fibrous material with a bonding material comprising an aqueous adhesive composition emulsified with a readily volatile, water-insoluble liquid, forming the mixture into suitable shapes, and treating the shaped mass to separate the volatile constituents thereof.

10. A process of manufacturing porous fibrous block material which comprises mixing fibrous material with a bonding material including an aqueous protein adhesive composition emulsified with a readily volatile, water-insoluble liquid, forming the mixture into suitable shapes, and 11. A process of manufacturing porous block material which comprises mixing particles of porous material with a bonding material including an aqueous casein adhesive composition emulsified with a readily volatile, water-insoluble liquid, forming the mixture into suitable shapes, and treating the shaped mass to separate the volatile constituents thereof.

12. A process of manufacturing porous fibrous block material which comprises mixing fibrous material with a bonding material including an emulsion of an aqueous adhesive composition and a water-insoluble organic liquid, forming the mixture into suitable shapes, and heating the shaped mass to separate the volatile constituents thereof.

13. A process of manufacturing porous block material which comprises mixing particles of porous material with a bonding material comprising an emulsion of an aqueous adhesive and a water-insoluble, readily volatile liquid, the readily volatile liquid in said emulsion constituting the dispersed phase and the aqueous adhesive the continuous phase, forming the mixture into suitable shapes, and treating the shaped mass to separate the volatile constituents thereof.

14. A process of manufacturing porous block material which comprises mixing particles of porous material with a bonding material comprising an emulsion including an adhesive material, a volatile water-insoluble organic liquid, and water, forming the mixture into suitable shapes, and heating the shaped mass to separate the volatile constituents thereof.

15. The preparation of a permeable, shaped, mottled article of manufacture by a process comprising wetting lots of nodulated rock wool each with a differently colored emulsion containing gasoline, an aqueous alkaline casein solution, and a coloring substance, making a non-intimate mixture of the thus differently colored lots of rock wool, shaping the resulting mixture, and drying it.

16. A permeable sound absorbing article comprising fibers and a porous binder distributed thereover and adhering the fibers into a rigid unit, the said binder including the non-volatile ingredients of a mixture of casein, water, sodium hydroxide, a hydrated salt of a multivalent metal, and gasoline.

17. A permeable sound absorbing article comprising fibrous material in the form of nodules and a porous binder distributed thereover and adhering the fibers into a rigid unit, the said binder including the non-volatile ingredients of a mixture of casein, water, sodium hydroxide, aluminum sulphate, and gasoline.

18. A permeable sound absorbing article comprising sound absorbing particles provided with voids and a porous binder distributed thereover and adhering the fibers into a rigid unit, the said binder including a waterproofing agent minimizing the tendency to absorb water while permitting freely the entrance of sound into the said article.

HARRY E. HOLCOMB.